(12) United States Patent
Rognon et al.

(10) Patent No.: US 9,568,070 B2
(45) Date of Patent: Feb. 14, 2017

(54) POWER TRANSMISSION BELT WITH THERMOPLASTIC FILM CONTAINING A SILICONE ELASTOMER

(71) Applicant: Hutchinson, Paris (FR)

(72) Inventors: Julie Rognon, Saint Cyr sur Loire (FR); Marc Grellier, Sorigny (FR); Jacques Drouvroy, Corquilleroy (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 14/433,453

(22) PCT Filed: Oct. 8, 2013

(86) PCT No.: PCT/EP2013/070915
§ 371 (c)(1),
(2) Date: Apr. 3, 2015

(87) PCT Pub. No.: WO2014/056892
PCT Pub. Date: Apr. 17, 2014

(65) Prior Publication Data
US 2015/0276023 A1    Oct. 1, 2015

(30) Foreign Application Priority Data
Oct. 8, 2012  (FR) ..................... 12 59550

(51) Int. Cl.
*F16G 1/28*    (2006.01)
*F16G 5/20*    (2006.01)
(Continued)

(52) U.S. Cl.
CPC ............. *F16H 7/023* (2013.01); *F16G 1/10* (2013.01); *F16G 1/14* (2013.01); *F16G 1/28* (2013.01); *F16G 5/08* (2013.01); *F16G 5/20* (2013.01)

(58) Field of Classification Search
CPC ....... C08L 83/04; C08L 23/10; C08L 2666/06; C08L 2666/28; F16G 1/28
(Continued)

(56) References Cited

U.S. PATENT DOCUMENTS 3,871,946 A      3/1975  Romanski et al.
3,884,866 A  *   5/1975  Jeram ................... A61L 27/44
                                                            523/203
(Continued)

FOREIGN PATENT DOCUMENTS

DE   10 2008 055 497 A1   6/2010
DE   10 2008 055 530 A1   6/2010
(Continued)

OTHER PUBLICATIONS

International Search Report and Written Opinion for Application No. PCT/EP2013/070915 dated Jan. 13, 2014.

*Primary Examiner* — Henry Liu
(74) *Attorney, Agent, or Firm* — Alston & Bird LLP (57) ABSTRACT

A power transmission belt having elastomer teeth based on an ethylene alpha-olefin elastomer, provided with an external film, is provided in which the external film is based on a thermoplastic olefin, the thermoplastic of the film being associated with a silicone elastomer that represents at least 20% by weight of the total weight of the film and with a compatibilizing element that ensures, within the film, compatibility between the thermoplastic and the silicone elastomer.

16 Claims, 3 Drawing Sheets

(51) Int. Cl.
*F16G 1/00* (2006.01)
*F16G 5/00* (2006.01)
*F16G 9/00* (2006.01)
*F16H 7/02* (2006.01)
*F16G 1/10* (2006.01)
*F16G 5/08* (2006.01)
*F16G 1/14* (2006.01)

(58) Field of Classification Search
USPC .................................................. 474/204, 264
See application file for complete search history.

(56) References Cited

U.S. PATENT DOCUMENTS

| | | | | |
|---|---|---|---|---|
| 3,957,713 | A * | 5/1976 | Jeram | A61L 27/18 524/703 |
| 6,251,977 | B1 | 6/2001 | Georget et al. | |
| 2008/0207371 | A1 | 8/2008 | Dieudonne et al. | |
| 2009/0011883 | A1 * | 1/2009 | Wu | D01F 6/62 474/205 |
| 2009/0040451 | A1 * | 2/2009 | Suzuki | C08J 5/18 349/183 |
| 2009/0142572 | A1 * | 6/2009 | Burlett | B29D 29/08 428/295.1 |
| 2009/0270545 | A1 * | 10/2009 | Sahnoune | C08L 23/10 524/476 |
| 2010/0075793 | A1 * | 3/2010 | Cretin | F16G 1/10 474/205 |
| 2010/0331466 | A1 * | 12/2010 | Ouhadi | C08L 23/0815 524/381 |
| 2011/0269589 | A1 * | 11/2011 | Schleicher | F16G 1/28 474/205 |
| 2011/0281984 | A1 | 11/2011 | Garois et al. | |
| 2012/0071286 | A1 * | 3/2012 | Pasch | B29D 29/08 474/205 |

FOREIGN PATENT DOCUMENTS

| | | |
|---|---|---|
| FR | 2 779 731 | 12/1999 |
| FR | 2 898 171 | 9/2007 |
| FR | 2 936 291 | 3/2010 |
| FR | 2 959 235 | 10/2011 |

* cited by examiner

POWER TRANSMISSION BELT WITH THERMOPLASTIC FILM CONTAINING A SILICONE ELASTOMER

FIELD

The present invention relates to a power transmission belt.

The belt may be a ribbed belt in which the ribs are trapezoidal or striated, e.g. V-shaped ribs. The belt may also be a cog belt, also known as a timing belt.

The ribs of such a belt, which are components made of vulcanized rubber, present faces that are to come into direct contact with a driver pulley and with accessory pulleys that are driven by an engine. These ribs form the teeth formed in the gum of the belt.

Systems driven by a belt of this type are used in numerous fields, such as the industrial field, the domestic appliance field, or the automotive field.

This type of belt needs to satisfy numerous constraints simultaneously. Mention may be made of thermal constraints, mechanical constraints, and more recently acoustic constraints. It can be seen that these constraints are continuously increasing.

BACKGROUND

Power transmission belts are known in which the gum is made of a polybutadiene and chloroprene material (also known as polybutadiene rubber/chloroprene rubber or (BR/CR)).

That material is capable of satisfying some of the above-mentioned constraints, in particular mechanical constraints and acoustic constraints.

Nevertheless, that material does not behave well at high temperatures.

Too great a temperature constraint leads to bakelization of the belt which can no longer operate correctly.

Power transmission belts are known in which the teeth are made out of an ethylene-propylene-diene-monomer (EPDM) material. This applies for example to patent application FR 2 779 731 where the belt also has cords.

That material, unlike the BR/CR material, presents good high temperature properties.

Nevertheless, it presents a coefficient of friction with pulleys that is relatively high. Unfortunately, a high coefficient of friction can lead to high levels of shear stress at the interface between the gum and the cords. These stresses can thus lead to the cords being torn out, or sometimes to the teeth being torn off.

Furthermore, too high a coefficient of friction can lead to a level of (acoustic) noise that does not comply with the ever stricter requirements being imposed by clients.

Numerous solutions have thus been sought to deal with these problems of cords being torn out and of noise on belts having teeth made of a material based on EPDM.

For this purpose, Documents FR 2 898 171 and FR 2 936 291 propose adding a protective film on the outer surface of the teeth that might be made of EPDM, which film is for coming into contact with the pulleys.

More precisely, application FR 2 898 171 shows the presence of a thermoplastic film containing polyethylene. Nevertheless, in certain situations of high thermomechanical stresses, the film can abrade quickly and thus no longer perform its function.

In application FR 2 936 291, the protective film has a barrier layer made of thermoplastic and an outer coating, e.g. made of polyethylene that is partially included in the thermoplastic barrier layer. That solution is complex to implement and expensive.

There therefore exists a need for a power transmission belt that presents excellent performance for satisfying the mechanical and/or thermal and/or acoustic constraints that are now being required.

SUMMARY

To this end, the invention provides a power transmission belt presenting elastomer teeth based on ethylene alpha olefin elastomer provided with an outer film, the belt being characterized in that the outer film is made on the basis of an olefin thermoplastic, said thermoplastic of the film being associated with a silicone elastomer representing at least 20% by weight of the total weight of the film and with a compatibilizer element for ensuring compatibility between the thermoplastic and the silicone elastomer within the film.

The belt may also present at least one of the following characteristics, taken singly or in combination:
- the silicone elastomer represents 20% to 80% by weight of the total weight of the film, and preferably 20% to 60%;
- the silicone elastomer presents 25% to 50% by weight of the total weight of the film;
- the compatibilizer element represents less than 10% by weight of the total weight of the film;
- the thermoplastic of the film comprises at least 30% polyethylene by weight relative to the total weight of the thermoplastic;
- the thermoplastic of the film comprises 30% to 100% polyethylene and in particular 50% to 100% polyethylene by weight relative to the total weight of the thermoplastic;
- the thermoplastic of the film comprises 75% to 100% polyethylene by weight relative to the total weight of the thermoplastic;
- the thermoplastic of the film is constituted by a mixture of polyolefins containing polyethylene;
- the thermoplastic of the film is constituted by a copolymer based on polyethylene, e.g. an ethylene octene-polyethylene copolymer;
- said ethylene alpha olefin elastomer of the teeth is an EPDM or an EPM;
- the compatibilizer element is constituted at least by a functionalized polyolefin and/or a polyorganosiloxane;
- the film also includes particles selected from particles of graphite, carbon black, molybdenum bisulfide, polytetrafluoroethylene, and/or silica titanium dioxide; and
- the thickness of the film lies in the range 50 micrometers (μm) to 500 μm.

BRIEF DESCRIPTION OF THE DRAWINGS

The invention can be better understood and other objects, advantages, and characteristics thereof appear more clearly on reading the following description made with reference to the accompanying drawings, in which.

DETAILED DESCRIPTION

In the context of the invention, the power transmission belt has teeth made of elastomer based on ethylene alpha olefin elastomer provided with an outer film.

The outer film is made on the basis of an olefin thermoplastic. Within the film, the thermoplastic is associated with a silicone elastomer representing at least 20% by weight of the total weight of the film and with a compatibilizer element for providing compatibility between the thermoplastic and the silicone elastomer.

The elastomer forming the teeth based on ethylene alpha olefin may be ethylene-propylene-diene-monomer (EPDM) or ethylene-propylene-monomer (EPM). Under such circumstances, the curing agent for the teeth is generally of the peroxide type.

The olefin thermoplastic of the film is then a thermoplastic capable of co-curing with the peroxide type agent for the elastomer of the teeth.

For example, this thermoplastic includes polyethylene, advantageously at a proportion by weight of 30% relative to the total weight of the thermoplastic.

Advantageously, the thermoplastic of the film has 30% to 100% polyethylene and in particular 50% to 100% polyethylene, by weight relative to the total weight of the thermoplastic.

Still more advantageously, the thermoplastic of the film has 75% to 100% polyethylene, by weight relative to the total weight of the thermoplastic.

In another example, the olefin thermoplastic of the film is constituted by a mixture of polyolefins containing polyethylene.

In another example, the olefin thermoplastic of the film is constituted by a copolymer based on polyethylene, e.g. an ethylene-oxide-polyethylene copolymer.

More generally, the thermoplastic of the film may be constituted either by homopolymers, or by copolymers that are based on ethylene if the gum of the teeth is based on ethylene alpha olefin, still for the purpose of improving adhesion between the film and the gum of the teeth.

Naturally, the thermoplastic of the film may also be made using homopolymers or copolymers based on propylene, octene, butene, butadiene, penetene, etc. . . . , as a function of the nature of the elastomer constituting the teeth, in order to ensure good adhesion between the film and the gum of the teeth.

The presence of polyethylene in the film makes it possible to ensure very good adhesion by co-curing with the ethylene alpha olefin contained in the teeth, in particular EPDM or EPM, because of the presence of a peroxide type curing system.

The silicon elastomer may comprise one or more silicones. For example, it may comprise a two-component liquid silicone elastomer.

Furthermore, and by way of example, the element for making the olefin thermoplastic of the film (e.g. based on (poly-)ethylene) compatible with the silicone elastomer in order to form a homogeneous mixture in the film is then constituted by at least one functionalized polyolefin and/or a polyorganosiloxane.

Below, this element is referred to as the compatibilizer element.

The functionalized polyolefin is advantageously adapted to the nature of the thermoplastic in question for the film. For example, a compatibilizer element of polyolefin polypropylene type is adapted to a thermoplastic of polyethylene or polypropylene type.

There follow the results of experimental tests that reveal the advantage of the invention.

Test 1: Industry Field

In the field of the compressor industry, it is found that conventional belts with teeth made of BR/CR bakelize under the effect of high thermomechanical stresses, which prevents them from continuing to operate normally (D1).

Furthermore, belts made of standard EPDM present firstly cord tear-out phenomena associated with high shear stresses at the gum/cord interface due to a high coefficient of friction (D2).

In both situations, the lifetime of the belt is thus limited either because of the bakelization phenomenon (D1) or else because of cord tear-out (D2).

Test 1 shows that a belt having its teeth made of EPDM with an external film, referred to below as film A, based on a thermoplastic associated with a silicone elastomer presents much better performance in terms of lifetime than existing belts according to D1 or D2.

The film A is constituted of 58.3% polyethylene, 39.2% silicone elastomer, and 2.5% compatibilizer element. These proportions are given by weight, relative to the total weight of the film A.

Specifically, the compatibilizer element is constituted by maleic anhydride grated polypropylene (functionalized polyolefin) and polyorganosiloxane.

The belt of the invention made with the film A is referred to as "belt A".

Furthermore, the belt was a J-type poly-V belt and the teeth of the belt were made of EPDM.

In the context of test 1, three tests (D1, D2, belt with film A of the invention) were undertaken on a compressor under the following conditions:
driver diameter=18.1 millimeters (mm);
driven diameter=89 mm;
temperature=90° C.; and
speed/torque cycle: every 42 seconds (s), the driver speed was increased from 0 to 17,000 revolutions per minute (rpm), and the driven torque was raised from 0 to 2.78 newton meters (Nm).

Figure 1:
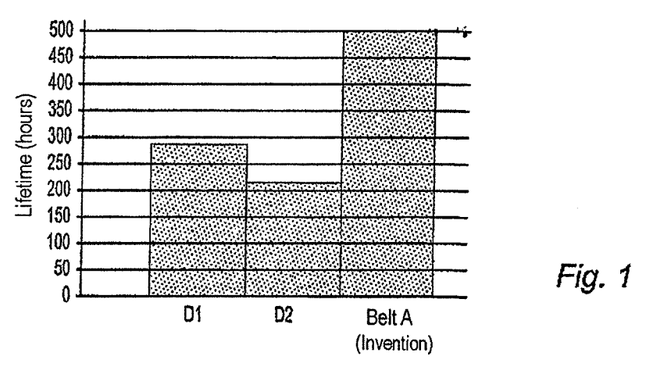
FIG. 1 shows the lifetimes of various belts, one of which is a belt in accordance with the invention.

The results of the tests are provided in FIG. 1.

As can be seen in FIG. 1, only belt A made it possible to reach a lifetime exceeding 500 hours (h). The belt according to D1 did not reach a lifetime of 300 h and the belt according to D2 reached a lifetime limited to 200 h.

Test 1 thus clearly shows the advantage of the solution proposed by the invention.

Furthermore, it should be observed that no noise problem was detected during the test.

Test 2: Household Appliance Field

For the household appliance field, a belt was tested having another type of film, referred to below as film B.

In this field, it should be observed that mechanical stresses and abrasion are high. Limited lifetimes are thus observed.

The structure of the belt including the film B was "standard" for a household appliance application, namely a J-type poly-V belt.

Furthermore, its teeth were made of EPDM.

The film B is constituted by 58% polyethylene, 38.7% silicone elastomer, and 3.3% compatibilizer element. These proportions are given by weight, relative to the total weight of the film B.

Specifically, the compatibilizer element was constituted by maleic anhydride grafted polyproplene (functionalized polyolefin) and polyorganosiloxane.

That belt is referred to below as "belt B".

Three tests were carried out (test 2.1 referred to as "unbalance" for measuring the lifetime of the belt; test 2.2 corresponding to a so-called "pilling" measurement representing the tendency of abrasion to agglomerate in the bottoms of the teeth, which test was performed immediately after the "unbalance" test; and test 2.3 "abrasion").

Test 2.1: Unbalance

The belt B was tested in comparison with a reference belt. The reference belt was a J-type poly-V belt with teeth made of BR/CR, without an external film.

The test conditions used for test 2.1 were as follows:
diameter of driver pulley=15 mm;
diameter of driven pulley=300 mm;
motor speed 1500 rpm with an (unbalance) mass M=8.6 kilograms (kg) having its center of gravity G spaced at a distance d=315 mm from the axis of rotation R of the driven pulley (which corresponds to mean driven torque of 18.7 N.m and maximum torque of 29.4 N.m); and
temperature=ambient (20° C. to 25° C.)

Figure 2:
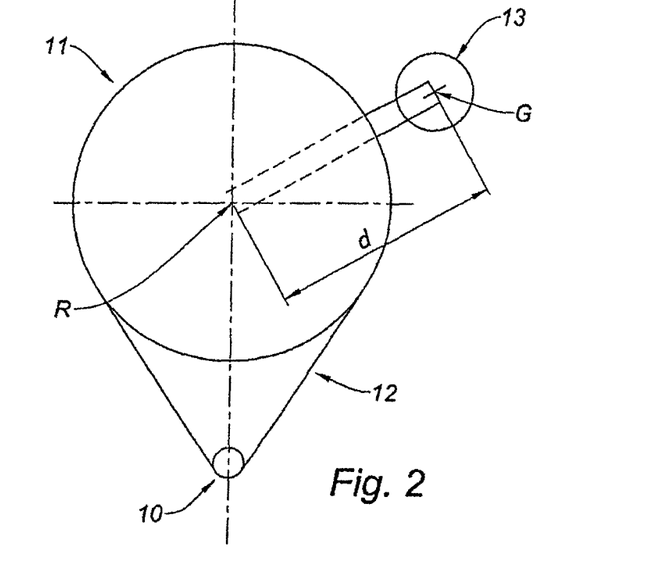
FIG. 2 shows an experimental setup used for measuring the lifetime of a belt.

The experimental setup is shown in FIG. 2. In this figure, there can be seen the presence of the driver pulley 10, the driven pulley 11, the belt 12 (belt B) passing over the two pulleys 10 and 11, and the unbalance 13.

Table 1 below shows that "belt B of the invention" presented a lifetime (170 h) about 2.8 times as long as the lifetime (60 h) of the "reference" belt.

TABLE 1

|  | Lifetime (h) | Lifetime on base 100 | Mode of degradation |
| --- | --- | --- | --- |
| Belt B; invention | 170 | 283 | Torn-out cords and two torn-out teeth |
| Reference | 60 | 100 | Four torn-out cords |

Test 2.2: "Pilling" Characterizing the Abrasion Suffered by the Belt

Figure 3:
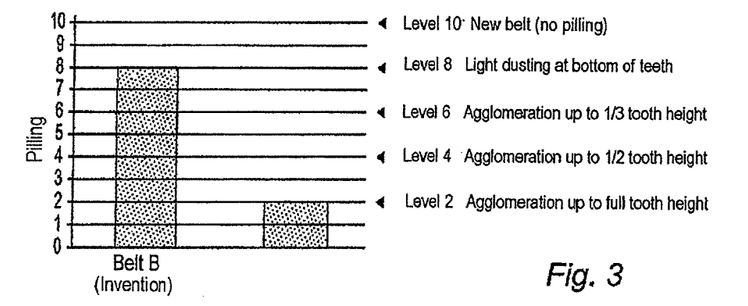
FIG. 3 shows the abrasion of various belts, one of which is a belt in accordance with the invention.

After performing the "unbalance" test, each of the two belts, namely the belt B and the reference belt, were subjected to a "pilling" measurement, with the results being shown in FIG. 3.

The "pilling" measurement is plotted up the ordinate axis and represents the tendency of the abrasion to re-agglomerate in the bottoms of the teeth. A new belt, without abrasion, presents a "pilling" value of 10 and an abraded belt presents a "pilling" value that is strictly less than 10. Thus, the more re-agglomeration a belt contains in the bottoms of its teeth the lower its "pilling" value.

In FIG. 3, it can be seen that the belt B was subjected to less re-agglomeration than the reference belt. More precisely, there can be seen a factor of 4 between these two belts concerning their "pilling" values.

The belt B thus presents a much better tendency for non-agglomeration than prior art belts in the domestic appliance field.

Test 2.3: Abrasion Suffered by the Belt, Additional Test

An abrasion test was also performed on the belts B and reference, in addition to the "pilling" test.

This test was performed using an abrasive placed in contact with each belt. The conditions of the test were as follows, for both belts:
pulley diameter (smooth, i.e. without teeth, as may apply to a roller)=60 mm;
speed of rotation of the pulley=20 rpm;
temperature: ambient (20° C. to 25° C.);
duration of the test: 2 minutes (min) 30 s;
mass generating a force F=1.75 decanewtons (daN); and
characteristic of the abrasive: 240 grid corindon sheet.

The experimental setup used is as in FIG. 5, which is described below for test 4, with the exception that the pulley was fitted on its circumference with the abrasive in order to perform this test 2.3.

Figure 4:
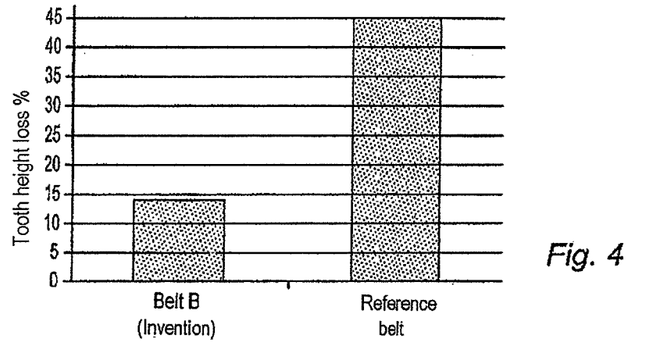
FIG. 4 also shows the abrasion of the belt shown in FIG. 3, using another abrasion test.

The results of these tests are given in FIG. 4, where the loss of relative height (%) of the teeth compared with the height of the teeth when the belt was in the new state is plotted up the ordinate axis.

The belt B presented a relative loss of only 14% of tooth height, whereas the "reference" belt presented a relative loss of 45% of this tooth height, i.e. more than three times as much.

Test 2.3 thus confirms the results of test 2.2, namely that belt B presents better abrasion behavior than do belts that are known in the domestic appliance field.

Furthermore, it should be observed that no noise problem was detected during these tests.

Test 3: Automotive Field

In the automotive field, noise phenomena are observed with existing belts, or more generally acoustic constraints under dry or wet conditions.

In order to reveal the advantage of the invention, tests were performed on a K-type poly-V belt with teeth made of EPDM and provided with a film A as described above. The belt is referred to below as "belt D".

Belt D was compared with two other reference belts, presently in use on the market. The standardized designation for all of those belts (D, REF I, REF II) is 1200 PK 6.

The first reference belt, referred to below as "belt REF I" presented the following characteristics: K-type poly-V belt with teeth made of EPDM and associated with polyamide surface flock.

The second reference belt, referred to below as "belt REF II" presented the following characteristics: K-type poly-V belt with teeth made of EPDM and associated with an outer film having a non-woven fabric at its surface.

Test 3 comprised three different sub-tests, namely an acoustic test 3.1 performed under dry conditions, an acoustic test 3.2 performed under wet conditions, and an abrasion test 3.3.

Test 3.1: Acoustic Under "Dry" Conditions

Test 3.1 consisted in an acoustic (noise) test on a misalignment test bench designed on the basis of the SAE J2432-2000 standard.

Before making a measurement, the belt was previously conditioned for at least 4 h at a temperature of 20° C. and with relative humidity of 50%.

The test was then performed under conditions that are referred to as "dry".

During the test, the driver pulley rotated at 2000 rpm and the tension applied to the belt was constant.

The measurement consisted in determining the misalignment angle between the driver pulley and the driven pulley at which grinding appears. Grinding is characterized by audible noise.

The results are given in Table 2. In Table 2, it is the belt REF I that was used as a reference both for the belt REF II and for the belt D in accordance with the invention.

TABLE 2

|  | State | Grinding |
| --- | --- | --- |
| Belt D (invention) | new | = |
|  | broken in | + |
| Belt REF II | new | = |
|  | broken in | + |
| Belt REF I | new | reference |
|  | broken in | reference |

In the new state, all three belts presented comparable performance.

In the broken-in state, belt D of the invention was better than belt REF I. This means that the misalignment angle between the pulleys from which grinding can be heard with belt D was greater than the angle at which said grinding was identified with belt REF I.

Furthermore, in the broken-in state, belt D of the invention presented performance comparable with that of belt REF II.

The belt D of the invention thus presents acoustic characteristics that are entirely advantageous.

Test 3.2: Acoustic in Wet Conditions

Test 3.2 consisted in placing belt D on a DW8 engine around five axes (accessories: alternator and power steering only). That engine is a commercially available engine known to the person skilled in the art.

The laying tension for the belt was 115 newtons per tooth per strand. That tension was obtained by adjusting a belt tensioner.

The engine was caused to run idle without any accessory load for a duration of 15 min.

Thereafter the belt was sprayed with a quantity of 300 milliliters (mL) of water for a duration of 30 s.

The engine was then run idle without any accessory load for a duration of 15 min.

With the engine still running idle, it was loaded simultaneously with the alternator (specifically 70 amps (A)) and power steering (operating at 50 bars) while spraying the belt with a quantity of 300 mL of water for a duration of 30 s.

The engine was then allowed to run idle once more without accessory load for 15 min.

Finally, it was loaded once more simultaneously with the alternator and the power steering while the belt was sprayed with a quantity of 5 mL of water for a duration of 5 s.

The measurement was performed during the last spraying operation.

The measurement consisted in measuring the time that elapses between the beginning of spraying the belt (beginning of the measurement), which coincides with the appearance of an audible noise, and the moment when the noise is no longer audible (end of measurement).

The above-described test conditions were applied to a belt under test that was either new or that had previously been broken in.

The results are given in Table 3. In Table 3, it is the belt REF I that was used as a reference both for the belt REF II and for the belt D in accordance with the invention.

TABLE 3

|  | State | Noise duration |
| --- | --- | --- |
| Belt D (invention) | new | + |
|  | broken in | + |
| Belt REF II | new | + |
|  | broken in | + |
| Belt REF I | new | reference |
|  | broken in | reference |

In Table 3, the "noise duration" column represents the time that elapses between the beginning of the measurement and the end of the measurement. The shorter the time, the better the performance of the belt. Thus, compared with the reference belt REF I, the sign "+" indicates a shorter duration of noise under identical test conditions.

Both in the new state and in the broken-in state, the belt D of the invention presents characteristics that are better than the belt REF I.

Furthermore, both in the new state and in the broken-in state, the belt D of the invention presents characteristics comparable to those of the belt REF II.

Test 3.3: Abrasion

Test 3.3 consisted in passing the belt over a three-axis test bench driven by a G9T diesel engine idling for 31 h.

The G9T engine is a commercially available engine. Nevertheless, in the context of this test, it was used merely as drive means.

The belt was laid with tension of 115 newtons per tooth per strand. That tension was obtained by adjusting a belt tensioner.

The engine drove an inertia of 5 gram meters squared (g·m$^2$) in rotation.

The three-axis test bench used was specific to this test. Thus, the positions of the accessories and the diameters of the pulleys were specific to this test.

Table 4 below gives the various characteristics of the test bench used for this test.

TABLE 4

| Pulley | Effective diameter (mm) | X position (mm) | Y position (mm) |
| --- | --- | --- | --- |
| 1: crank shaft (G9T engine) | 150 | 0 | 0 |
| 2: stationary roller | 60 | 118 | 218 |
| 3: alternator (inertia 5 g · m$^2$) and tension adjustment | 54.45 | −232.2 | 232.2 |

Figure 6:
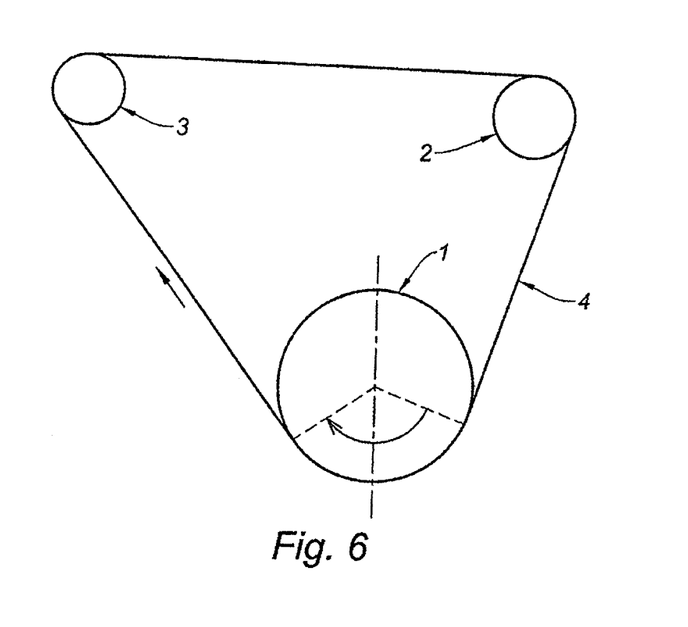
FIG. 6 is a diagrammatic face view of an automotive engine test bench used for measuring the abrasion of a belt.

FIG. 6 shows the test bench used. In particular, it should be observed that the relative positions of the various elements of the test bench as specified in Table 4 can be seen in FIG. 6. In this FIG. 6, the crank shaft pulley is referenced 1, the stationary roller 2, the alternator pulley 3, and the belt 4.

An idling diesel engine is known for its cyclical irregularities in terms of instantaneous speeds. These irregularities generate cyclical dynamic torque (under the effect of the driven inertia), giving rise to abrasion of the belt under the effect of slip where the belt contacts the various pulleys over which the belt passes.

The abrasion A of the belt is defined by a percentage (%). This abrasion percentage is calculated by measuring the mass of the belt D in the new state ($M_0$) and its mass at the end of the test ($M_{31}$), i.e. after 31 h of idling.

This gives: $A(\%) = 100\% * (M_0 - M_{31})/M_0$.

In order to show up the advantage of the invention, the belt D was compared with the belts REF I and REF II.

The results are given in Table 5 below:

TABLE 5

|  | Abrasion (%) |
| --- | --- |
| Belt D (invention) | 0.46 |
| Belt REF II | 1 |
| Belt REF I | 1.27 |

From Table 5, it can be seen that belt D of the invention presents better resistance to abrasion than the two reference belts REF I and REF II.

Other Tests: The Influence of the Proportion of Silicone Elastomer in the Film

All of the above tests were performed for belts with different films (film A or film B) in which the relative proportion by weight of silicone elastomer was about 38% to 40%.

In order to determine the influence of the proportion of silicone elastomer in the film on the properties of the belt of the invention, a test 4 was performed, running several tests with different proportions of silicone elastomer.

Test 4 is described below.

The results given in test 4 are applicable to all potential application fields, such as the industry, domestic appliance, or automotive fields.

These tests set out to determine the influence of the proportion of silicone present in the film on the abrasion resistance, on the lifetime, and on the friction coefficient of the belt under test.

The abrasion test corresponded to above-described test 2.3 (use of an abrasive).

The lifetime test corresponded to above-described test 2.1 (referred to as an "unbalance" test, in which the observed mode of degradation was either teeth being torn off or cord being torn off).

Finally, a last test, namely test 4, set out to determine the coefficient of friction (COF) of the belt with the pulley.

For test 4, the belt 100 in question was placed on a pulley 20. One end of the belt was mounted on a mass 30 generating a force F of 1.75 daN, the other end being mounted on a structure where the magnitude of the tension T exerted on the belt was measured by appropriate measurement means 40, such as a force sensor. The diameter of the pulley 20 was 60 mm and it was rotated at a speed of 43 rpm throughout the duration of the test, which was 2 min.

Figure 5:
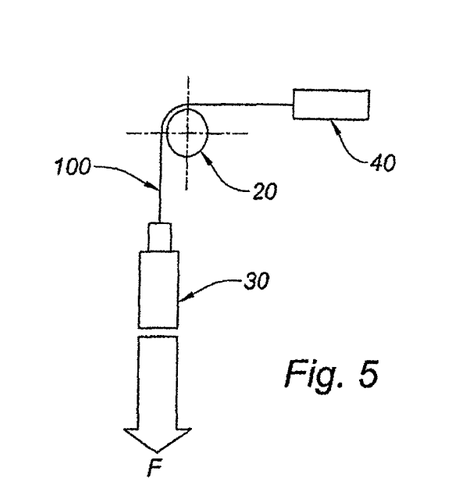
FIG. 5 is a diagram of an experimental installation used for measuring the coefficients of friction of various belts with a pulley.

A diagram representative of the setup used for performing test 4 is shown in FIG. 5.

The coefficient of friction COF was then determined using the following relationship:

$$COF = (1/\alpha) * \ln(T-F)$$

where:

α is the angle the belt is wound around the pulley, and in this example α=π/2 (rad);

ln is the natural logarithm;

T is the tension measured at one of the ends of the belt in newtons (N); and

F is the force generated by the mass arranged at the other end of the belt (N).

The tested belts in accordance with the invention were J-type poly-V belts with teeth made of EPDM. Nevertheless, the comparisons observed with J-type poly-V belts can be transposed to other types of belt, such as K-type belts.

The outer films were based on ethylene and contained respectively 29.3%, 38.7%, or 48.8% silicone elastomer.

More precisely, the first film comprised 68.3% polyethylene, 29.3% silicone elastomer, and 2.4% compatibilizer element.

The second film comprised 58% polyethylene, 38.7% silicone elastomer, and 3.3% compatibilizer element.

Finally, the third film comprised 48.8% polyethylene, 48.8% silicone elastomer, and 2.4% compatibilizer element.

All of the proportions are given by weight relative to the total weight of the film.

The prior art belt corresponds to the belt according to D1 (cf. Test 1), i.e. a belt having teeth made of BR/CR, without an external film.

The results are given in Table 6 below.

TABLE 6

|  | Silicone (%) | Test 2.3 (abrasion, base 100) | Test 2.1 (lifetime, base 100) | Test 4 (COF) |
| --- | --- | --- | --- | --- |
| Belt of the invention | 29.3 | 16.7 | 221 | 1 |
|  | 38.7 | 31.1 | 283 | 0.85 |
|  | 48.8 | 55.6 | not measured | 0.7 |
| D1 Belt (prior art) | — | 100 | 100 | 1.8 |

These tests show that all of the belts in accordance with the invention presented better abrasion resistance, longer lifetime, and smaller coefficient of friction, i.e. they were likely to generate less noise, compared with the prior art belt.

These tests also show that for a belt in accordance with the invention, the greater the proportion of silicone elastomer in the film, the more the abrasion of the belt increases. And the more the proportion of silicone elastomer increases in the film, the more its lifetime increases.

It can be seen from these tests, that the proportion of silicone may be selected in order to adjust the abrasion level and the lifetime of the belt.

Furthermore, it should be observed that the proportion of silicone in the film makes it possible to adjust the friction coefficient of the belt on the pulley. These tests thus show that for a belt of the invention, the more the COF increases, the more the lifetime of the belt decreases. They also show that the more the COF increases, the more the abrasion level decreases, which is associated with the fact that there is then less slip. Furthermore, the more the COF increases, the more the level of noise generated by the belt is likely to increase.

Thus, the proportion of silicone elastomer in the film makes it possible to adjust the abrasion of the belt (mechanical stress), its lifetime (mechanical stress associated with problems of tearing away teeth or cords), and also its noise level (acoustic constraint).

An elastomeric composition including a thermoplastic, silicone, and a compatibilizer element, together with the corresponding method of fabrication are already known from Document FR 2 959 235.

Nevertheless, that document does not identify the advantage of such a composition for application as an outer film on a power transmission belt for the purpose of solving the specific problems associated with power transmission belts.

Consequently, the advantages that said composition might have for reducing the abrasion of the belt, for increasing its lifetime while avoiding tearing out of the cord or of the teeth of the belt, or indeed for reducing its noise level were not in any way obvious for the person skilled in the art acting in the field of power transmission belts.

Finally, it should be observed that in the context of the invention, the silicone elastomer may represent 20% to 90% by weight of the total weight of the film.

More precisely, the silicone elastomer may represent 20% to 80% by weight of the total weight of the film.

Advantageously, the silicone elastomer may represent 20% to 70% by weight of the total weight of the film.

More advantageously, the silicone elastomer may represent 20% to 60% by weight of the total weight of the film.

Even more advantageously, the silicone elastomer may represent 20% to 50% by weight of the total weight of the film.

This proportion, as defined above, may also be selected to lie in the range 25% to 50% or 29% to 49%. In order to fabricate a belt in accordance with the invention, it is possible to envisage using the following method:

a) applying the film on an "active" or external face of a non-vulcanized belt blank, said film preferably being made of a material that presents at the beginning of this step a Young's modulus that is greater than that of the raw elastomer of the teeth; and b) vulcanizing the blank with the film to form a belt having its outer face presenting teeth coated in said film.

By means of this method, no woven or non-woven or even knitted fabric needs to be provided within the outer film.

The invention claimed is:

1. A power transmission belt presenting elastomer teeth based on ethylene alpha olefin elastomer provided with an outer film, wherein the outer film of the belt is made on the basis of an olefin thermoplastic, said thermoplastic of the film being associated with a silicone elastomer representing at least 20% by weight of the total weight of the film and with a compatibilizer element for ensuring compatibility between the thermoplastic and the silicone elastomer within the film.

2. A belt according to claim 1, wherein the silicone elastomer represents 20% to 80% by weight of the total weight of the film.

3. A belt according to claim 1, wherein the silicone elastomer presents 25% to 50% by weight of the total weight of the film.

4. A belt according to claim 1, wherein the compatibilizer element represents less than 10% by weight of the total weight of the film.

5. A belt according to claim 1, wherein the thermoplastic of the film comprises at least 30% polyethylene by weight relative to the total weight of the thermoplastic.

6. A belt according to claim 5, wherein the thermoplastic of the film comprises 30% to 100% polyethylene by weight relative to the total weight of the thermoplastic.

7. A belt according to claim 5, wherein the thermoplastic of the film comprises 75% to 100% polyethylene by weight relative to the total weight of the thermoplastic.

8. A belt according to claim 5, wherein the thermoplastic of the film is constituted by a mixture of polyolefins containing polyethylene.

9. A belt according to claim 5, wherein the thermoplastic of the film is constituted by a copolymer based on polyethylene.

10. A belt according to claim 1, wherein said ethylene alpha olefin elastomer of the teeth is an EPDM or an EPM.

11. A belt according to claim 1, wherein the compatibilizer element is constituted at least by a functionalized polyolefin and/or a polyorganosiloxane.

12. A belt according to claim 1, wherein the film also includes particles selected from the group consisting of particles of graphite, carbon black, molybdenum bisulfide, polytetrafluoroethylene, and silica titanium dioxide, and combinations thereof.

13. A belt according to claim 1, wherein the thickness of the film lies in the range 50 µm to 500 µm.

14. A belt according to claim 1, wherein the silicone elastomer represents 20% to 60% by weight of the total weight of the film.

15. A belt according to claim 5, wherein the thermoplastic of the film comprises 50% to 100% polyethylene by weight relative to the total weight of the thermoplastic.

16. A belt according to claim 5, wherein the thermoplastic of the film is constituted by an ethylene octene-polyethylene copolymer.

* * * * *